United States Patent [19]

Graves et al.

[11] Patent Number: 5,202,122
[45] Date of Patent: Apr. 13, 1993

[54] PROCESS FOR ENHANCING THE HYPOCHOLESTEROLEMIC EFFECT OF EDIBLE PULP AND THE PRODUCT OBTAINED THEREBY

[75] Inventors: Frederic A. Graves, Ham Lake; Ani Huang, Fridley, both of Minn.

[73] Assignee: Humanetics Corporation, Chaska, Minn.

[21] Appl. No.: 682,567

[22] Filed: Apr. 9, 1991

Related U.S. Application Data

[63] Continuation-in-part of Ser. No. 664,490, Mar. 4, 1991, abandoned, which is a continuation of Ser. No. 479,964, Feb. 14, 1990, abandoned, which is a continuation-in-part of Ser. No. 429,166, Oct. 30, 1989, abandoned, Continuation-in-part of Ser. No. 664,490, Mar. 4, 1991, abandoned, which is a continuation of Ser. No. 479,964, Feb. 14, 1990, abandoned, which is a continuation-in-part of Ser. No. 429,166, Oct. 30, 1989, abandoned.

[51] Int. Cl.$^5$ .................. A61K 35/78; C07H 23/00
[52] U.S. Cl. .................. 424/195.1; 426/615; 530/500; 530/504; 536/2; 536/101
[58] Field of Search ................ 536/101.2; 530/500, 530/504; 424/195.1; 426/615

[56] References Cited

U.S. PATENT DOCUMENTS

| | | | |
|---|---|---|---|
| 67,229 | 7/1867 | Tiffany | 530/101 |
| 2,531,431 | 11/1950 | Hills | 426/615 |
| 2,572,923 | 10/1951 | Gaver et al. | 530/101 |
| 3,966,984 | 6/1976 | Cocke et al. | 514/23 |
| 4,520,017 | 5/1985 | Tunc | 514/23 |
| 4,824,672 | 4/1989 | Day et al. | 514/23 |

FOREIGN PATENT DOCUMENTS

| | | | |
|---|---|---|---|
| 2283907 | 9/1974 | France | 514/23 |
| 2177100A | 1/1987 | United Kingdom | 514/23 |

OTHER PUBLICATIONS

James W. Anderson et al., *Food Science and Nutrition*, 1990, vol. 29, Issue 2, pp. 95-147.
Hoagland P., Pfeffer, P., *Cobinding of Bile Acids to Carrot Fiber*, J. Agric Food Chem., vol. 35, pp. 316-319 (1987).
Camire and Clydesdale, *Journal of Food Science*, vol. 46, pp. 548-551 (1981).
Johnson P., *Encyclopedia of Food Science, Colloidal Dispersions;* Polysaccharide gums, The Avi Publishing Group, p. 169.
Cellulose, *Kirk-Othmer, Encyclopedia of Chemical Technology*, vol. 4, pp. 593-614.
Abstract, *Why Carrots may Reduce Cholesterol*, 27 Jun. 1987.
Hoagland, et al. *ACS SYMP. Series* 1986 310 266-74
*Chemical Abstracts vol.* 105, 1986, Abstract 113884W.

*Primary Examiner*—Robert T. Bond
*Assistant Examiner*—E. C. Ward
*Attorney, Agent, or Firm*—Faegre & Benson

[57] ABSTRACT

Process for enhancing the natural bile acid binding capacity of edible pulp material by either heating an aqueous slurry of the pulp material to at least 40° C. and/or sequentially reacting pulp with a first reactant, such as sodium hydroxide, for activating the pendant hydroxyl groups on the polysaccharide components of the pulp material, a second reactant, such as chloroacetic acid, for carboxylating the activated pendant groups on the polysaccharides, and a third reactant, such as calcium hydroxide, for providing calcium ions which can ionically bond to the carboxylated pendant groups.

4 Claims, No Drawings

PROCESS FOR ENHANCING THE HYPOCHOLESTEROLEMIC EFFECT OF EDIBLE PULP AND THE PRODUCT OBTAINED THEREBY

This is a continuation-in-part of application Ser. No. 07/664,490 filed Mar. 4, 1991, now abandoned which is a continuation of application Ser. No. 07/479,964 filed Feb. 14, 1990, now abandoned which is a continuation-in-part of application Ser. No. 07/429,166 filed Oct. 30, 1989 now abandoned.

FIELD OF THE INVENTION

The invention broadly relates to dietary fiber. Specifically, the invention relates to methods for synthetically enhancing the hypocholesterolemic effect of dietary pulp.

BACKGROUND OF THE INVENTION

Cardiovascular Disease

Cardiovascular disease is the number one cause of death in the United States. Based upon statistics gathered by the American Heart Association, cardiovascular disease is believed to be responsible for more than one million deaths each year in the United States. These statistics also indicate that more than five million Americans suffer from some type of diagnosed symptomatic cardiovascular disease while an even larger number are believed to be suffering from an undiagnosed cardiovascular related disease.

Multiple factors are believed to contribute to the development of cardiovascular disease including cigarette smoking, high blood pressure, obesity, and a sedentary lifestyle. In addition, researchers in the field have concluded from various genetic, pathological, epidemiological and intervention studies that a causal relationship exists between serum cholesterol levels and the incidence of cardiovascular disease.

Accordingly, any program designed to reduce the incidence of cardiovascular disease should include steps to reduce serum cholesterol levels.

Cholesterol

Cholesterol is a component of all eucaryotic plasma membranes and is essential for the growth and viability of cells in higher organisms. Cholesterol can be obtained either directly from dietary sources or through in vivo synthesis when the amount of cholesterol obtained from dietary sources is insufficient.

The major sites of cholesterol synthesis in mammals are the liver and the intestine. The committed step in the synthesis of cholesterol is the formation of mevalonate from 3-hydroxy-methylglutaryl CoA which reaction is catalyzed by 3-hydroxy-methylglutaryl CoA reductase.

Dietary cholesterol controls the biosynthesis of cholesterol by inactivating existing 3-hydroxymethylglutaryl CoA reductase and suppressing the synthesis of additional reductase.

Cholesterol is transported through body fluids by lipoproteins. A lipoprotein is a particle consisting of a core of hydrophobic lipids surrounded by a shell of hydrophilic lipids and apoproteins. The hydrophobic core/hydrophilic surface of lipoproteins permits lipoproteins to solubilize highly hydrophobic lipids such as cholesterol. Lipoproteins are typically classified according to their density. The classes of lipoproteins include chylomicrons, chylomicron remnants, very low-density lipoproteins (VLDL), low-density lipoproteins (LDL), intermediate-density lipoproteins (IDL), and high-density lipoproteins (HDL).

Cholesterol and triacylglycerols obtained from dietary sources are carried from the intestine to adipose tissue and the liver by chylomicrons. The triacylglycerols carried by the chylomicrons are rapidly hydrolyzed by lipases located in the capillaries of the adipose tissue. The resultant cholesterol-rich residues remaining after hydrolyzation of the triacylglycerols are known as chylomicron remnants and are eventually taken up by the liver.

Cholesterol and triacylglycerols synthesized endogenously, in contrast with that obtained from dietary sources, are carried by very-low-density lipoproteins (VLDL). The triacylglycerol content of a VLDL is hydrolyzed by the same lipases that act on chylomicrons. The resulting cholesterol ester-rich remnants remaining after hydrolyzation of the triacylglycerols from the VLDL are known as intermediate-density lipoproteins (IDL). An IDL is either taken up by the liver or converted into a low-density lipoprotein (LDL).

The LDLs contain the greatest percentage of cholesterol of any of the lipoproteins and are the major carriers of cholesterol in the blood. The LDLs are also the major constituent of atherosclerotic plaque. Each LDL contains a core of about 1500 esterified cholesterol molecules surrounded by a shell of hydrophilic phospholipids, unesterified cholesterols and apoproteins. The role of LDLs is to transport cholesterol through the blood stream to peripheral tissues and regulate the synthesis of cholesterol based upon the amount of cholesterol received from dietary sources.

High-density lipoproteins (HDL) pick up cholesterol released into the plasma from dying cells and membranes undergoing turn-over, esterify the cholesterol, and transfer the esterified cholesterol to a VLDL or a LDL by a transfer protein.

In general, cells other than those of the liver and intestine obtain the cholesterol they require for proper functioning from LDLs in blood plasma rather than through synthesis. These cells obtain cholesterol from by binding a LDL at a specific integral membrane receptor protein, internalizing the receptor-LDL complex, hydrolyzing the protein components of the LDL to free amino acids, hydrolyzing the cholesterol esters of the LDL, and then returning the cholesterol-free LDL receptor to the plasma membrane. The released unesterified cholesterol is either used immediately by the cell in membrane synthesis or reesterified and stored inside the cell for later use. It is noted that reesterified cholesterol contains mainly oleate and palmitoleate monounsaturated fatty acids while LDL cholesterol esters contain mainly linoleate polyunsaturated fatty acid.

It is believed that cholesterol contributes to the incidence of such cardiovascular related problems as heart attacks, strokes and peripheral vascular disease by contributing to the formation of arterial atherosclerotic plaques which block the flow of blood through the arteries.

Because of such health risks associated with the level of serum cholesterol, the medical community recommends that serum cholesterol levels be monitored and maintained below about 175 mg/dl. However, despite such warnings, most Americans have a serum cholesterol level well in excess of the recommended 175 mg/dl.

Dietary Fiber

Recent studies have demonstrated that a high fiber diet can decrease serum cholesterol levels. However, the mechanism(s) responsible for this hypocholesterolemic effect are not fully understood.

One prevalent theory is that dietary fiber binds and removes bile acids from the system and thereby causes cholesterol to be converted into replacement bile acids. Specifically, Hoagland P.D. and Pfeffer, P.E., *Cobinding of Bile Acids to Carrot Fiber*, J. Agric. Food Chem. 1987, 35, 316–319 suggests that the bile acid binding capability of vegetable fiber is achieved through $Ca^{++}$ salt linkages between the pectin portion of the fiber and the bile acid.

Unfortunately, despite widespread dissemination of information regarding the health benefits which can be obtained by the consumption of dietary fiber, few individuals consume sufficient dietary fiber to produce a meaningful decrease in their serum cholesterol level. While this situation can be attributed to a variety of factors, one of the principle factors is believed to be the simple lack of dietary fiber in many of the highly processed staple food products currently being consumed.

Accordingly, a substantial need exists for a dietary food supplement having an effective hypocholesterolemic effect which can be incorporated into processed foods in quantities sufficient to significantly reduce serum cholesterol levels without adversely affecting the desirable attributes of the processed food.

SUMMARY OF THE INVENTION

We have discovered several related processes for improving the hypocholesterolemic effect of an edible pulp.

In a first embodiment, the process is direct at improving the hypocholesterolemic effect of an edible pulp by simply heating an aqueous slurry of the pulp to a temperature effective for enhancing the natural hypocholesterolemic effect of the pulp.

In a second aspect, the process is directed at increasing the concentration of pendant alkaline earth metal ions on the fiber contained in the pulp.

We have discovered three distinct methods for improving the natural hypocholesterolemic effect of an edible pulp under the second aspect of the invention. The first method includes the steps of treating the pulp so as to disrupt (rupture) the cell structure of the pulp, and then reacting the disrupted pulp with a reactant(s) capable of chemically coupling alkaline earth metal ions to the fiber material contained in the pulp. Without intending to be limited thereby, we believe that this first method increases the concentration of pendant alkaline earth metal ions on the fiber material by bonding alkaline earth metal ions to reactive pendant groups inherently present on the pectin portion of the fiber material. A typical reactant capable of achieving the desired reaction is an aqueous solution of an alkaline earth metal salt such as $CaCl_2$.

The second method includes the steps of (i) disrupting (rupturing) the cell structure of the pulp material, (ii) reacting the disrupted pulp material with a first reactant(s) capable of chemically modifying at least a portion of the pendant hydroxyl groups on the fiber material contained in the pulp to pendant groups capable of chemically coupling with alkaline earth metal ions, and then (ii) reacting the modified fiber material with a second reactant(s) capable of chemically coupling an alkaline earth metal ion to the modified pendant groups. An exemplary process includes the steps of (aa) preconditioning the pulp by reacting the pulp with an aqueous solution of NaOH, (bb) reacting the preconditioned pulp with an aqueous solution of $CH_2ClCOOH$ so as to carboxylate the pendant hydroxyl groups on the fiber material contained in the preconditioned pulp, and then (cc) reacting the carboxylated fiber material with CaOH so as to bond $Ca^{++}$ to the pendant carboxyl groups.

Unfortunately, we have discovered that the preconditioning step of the second method generally results in such a dramatic increase in the viscosity enhancing ability of the pulp material that continued processing of the preconditioned pulp requires the use of heavy-duty equipment capable of handling such highly viscous materials.

The third method sequentially combines the first and second methods so as to bond an alkaline earth metal ion to the inherently reactive sites on the fiber material contained in the pulp prior to chemically modifying at least a portion of the pendant hydroxyl groups on the fiber material.

We have discovered that by sequentially combining the first and second methods the greater increase in hypocholesterolemic effect associated with method two can be realized without the accompanying dramatic increase in viscosity.

Our invention is also directed towards the modified pulp material which results from treatment of pulp material in accordance with our process.

DETAILED DESCRIPTION OF THE INVENTION INCLUDING A BEST MODE
Definitions

As utilized herein, the term "accessible" means capable of being diffusively approached by a reagent in such a manner as to permit a potential reaction with the reagent.

As utilized herein, the term "carboxylating reactant" refers to a reactant capable of chemically modifying a substrate so as to create pendant carboxyl groups on the substrate.

As utilized herein, the term "chemically coupler" refers to the covalent and noncovalent bonding of molecules and includes specifically, but not exclusively, covalent bonding, electrostatic bonding, hydrogen bonding and van der Waals' bonding.

As utilized herein, the terms "edible" and "dietary" refer to material suitable for human consumption.

As utilized herein, the term "enhance" means to add, increase, improve and/or intensify.

As utilized herein, the term "fiber material" refers to materials comprised substantially of substances which are not digestible by the human digestive tract. Typical fiber materials include cellulose, hemicellulose, lignin and pectic material.

As utilized herein, the phrase "initial step" refers to a step which is performed prior to all other enumerated steps.

As utilized herein, the terms "ion" and "ionic state" refer to an atom or group of atoms that carry a positive or negative electric charge as a result of having lost or gained one or more electrons.

As utilized herein, the phrase "natural bile acid binding capacity" refers to the quantitative ability of a naturally existing and chemically unmodified material to bind bile acid in vivo such that the bound bile acid will remain bound to the material upon passage of the material out of the body.

As utilized herein, the term "pectic material" is employed as a collective designation to refer to protopectin, pectin, pectinate, pectic acid and pectate.

As utilized herein, the term "pulp" refers to that portion of a fruit or vegetable which remains after removal of the juice from the fruit/vegetable and typically includes various ratios of cellulose, hemicellulose, lignin, pectic material, and other water insoluble materials.

As utilized herein, the term "saturate" refers to contacting a solid with sufficient liquid such that a further increase in the volume of liquid will produce substantially no additional increase in surface contact between the liquid and the solid.

As utilized herein, the term "passive water" refers to water which does not contain intentionally added reagents capable of increasing the hypocholesterolemic effect of pulp.

Disclosure

We have discovered several processes for synthetically enhancing the natural hypocholesterolemic effect of edible pulp. A first aspect involves treatment of edible pulp material with heated passive water. A second aspect involves treatment of edible pulp material with interactive reagents capable of increasing the concentration of alkaline earth metal ions chemically coupled to the fiber material which constitutes the pulp.

Four mechanisms believed to be contributing to the enhanced hypocholesterolemic effect include (i) an enhanced ability of the treated dietary fiber to physically and/or chemically remove bile acids from the system and/or enhance bile acid synthesis so as to cause the body to synthesize replacement bile acid from cholesterol, (ii) an enhanced ability of the treated dietary fiber to interfere with lipid absorption and/or metabolism, (iii) an enhanced ability of the treated dietary fiber to be fermented into short-chain fatty acids (SCFA) which are believed to interfere with hepatic cholesterol metabolism, and (iv) an enhanced ability of the treated dietary fiber to favorably alter the concentration of and/or sensitivity to various hormones, such as insulin and glucagon, which affect hepatic cholesterol and lipid synthesis.

Without intending to be limited thereby, we believe that most of the enhanced hypocholesterolemic effect obtained from dietary fiber treated in accordance with the process of this invention is achieved by increasing the natural bile acid binding capacity of the fiber.

Bile

Bile salts are a group of highly effective organic detergents derived from cholesterol which contain both a polar and a nonpolar region. Bile salts are synthesized by the liver and stored in the gallbladder from where they are released into the small intestine for solubilizing dietary lipids. Solubilization of lipids by bile salts aids in digestion of the lipids as such solubilized lipids are more readily hydrolyzed and absorbed by the intestine.

Bile salts are synthesized from cholesterol by the conversion of cholesterol to trihydroxycoprostanoate which is then converted to cholyl CoA. Various bile salts such as glycocholate and taurocholate are then obtained by activation of the resultant cholyl CoA.

Fiber Material

The major constituents of typical dietary fiber include cellulose, hemicellulose, lignin, and pectic. The cellulose, hemicellulose and lignin portions are located within the cell structure where they provide support to the cell. The pectic portion is located between cells where it acts as a biological adhesive to hold the cells together.

Cellulose $(C_6H_{10}O_5)_n$ is one of the major polysaccharides of plants where it provides structure to the plant cells. Cellulose is the most abundant organic compound in the biosphere, comprising more than half of all organic carbon. Cellulose is a highly stable, water insoluble, unbranched polysaccharide consisting of glucose units joined by $\beta$-1,4 glycosidic bonds. Sequential glucose units are rotated 180 to permit hydrogen bonding of the ring oxygen of one glucose unit to the 3-OH group of the subsequent unit. Mammals are not capable of synthesizing cellulases and therefore cannot digest cellulose. However, some ruminants, such as cattle, harbor intestinal cellulase-producing bacterial which permit the digestion of cellulose by these mammals.

Hemicelluloses, despite the name, are carbohydrate polymers which have no chemical relation to cellulose. The name arose because these polysaccharides are commonly associated with cellulose. Typical hemicelluloses include arabin and galactin. Like cellulose, mammals are not capable of synthesizing the enzymes necessary to digest hemicellulose.

Lignin is a water insoluble polysaccharide composed of coniferyl, p-coumaryl and sinapyl alcohols in varying ratios dependent upon the plant species. Lignin joins with cellulose and hemicellulose to provide structure to the cell wall.

Pectin is a water soluble, branched polysaccharide consisting of D-galacturonate units joined by $\alpha$-1,4 glycosidic bonds interrupted with 1,2 L-rhamnose residues. The neutral sugars D-galactose, L-arabinose, D-xylose, and L-fucose form side chains from the $\alpha$-1,4 glycosidic backbone. The $\alpha$-1,4 glycosidic backbone includes about 5–10% by weight methylated carboxyl groups and about 5–10% by weight alpha acetyl groups. The molecular weight of pectin varies greatly from about 20,000 for sugar beet pectin up to about 200,000 for apple and citrus pectins.

Sources of dietary fiber suitable for use as the raw material in my process include specifically, but not exclusively, fruits such as apples, oranges, and grapefruit; vegetables such as carrots, corn, peas and sugar beets; grains such as barley, oats, rice and wheat; and grasses such as sugar cane.

First Aspect

The first aspect of the invention by which the natural hypocholesterolemic effect of a pulp material may be enhanced is a simple yet effective process which involves the step of heating an aqueous slurry of the pulp to a temperature effective for enhancing the natural hypocholesterolemic effect of the pulp.

The amount of water to be added to the pulp depends upon the type of pulp and several interactive factors which include heating costs (increased water= increased heating costs), slurry processability (increased water=increased processability), solubilization capacity (increased water=increased solubilization capacity) and equipment size (increased water=increased equipment size). Generally, a water to pulp weight ratio of about 2:1 to about 4:1 is satisfactory.

The temperature to which the pulp slurry should be heated depends upon pulp type and requires a balancing of heating costs (increased temperature=increased heating costs) and effectiveness (increased temperature=increased effectiveness). Generally, the pulp slurry should be heated to a temperature of about 4°-100° C. Temperatures of less than about 4° C. do not provide an effective enhancement in bile acid binding capacity regardless of other factors while temperatures above about 100° C. require the utilization of additional energy and implementation of a pressure vessel without providing commensurate benefits. Preferably, the pulp slurry should be heated to a temperature of about 40°-100° C., most preferably about 70-100° C., as such temperatures provide an effective enhancement in hypocholesterolemic effect within commercially acceptable time and pulp concentration limitations.

Depending upon the temperature of the pulp slurry and, to a significantly lesser extent, the pulp concentration, the pulp should remain in slurry form for about 2-60 minutes, preferably about 10-20 minutes.

Without intending to be limited thereby, we believe that the first aspect of the invention improves the hypocholesterolemic effect of an edible pulp by dissolving the soluble portion of the pulp material and thereby increasing the surface area of the fiber material effective for contacting and removing bile acid from the system. Based upon this theory, anything which increases the dissolution rate of the soluble portion of the pulp material would be effective in optimizing the process of this invention including increased slurry temperatures and decreased pulp concentrations.

Second Aspect

The second aspect of the invention involves various methods of attaching alkali metal ions to the naturally and/or synthetically reactive pendant groups on the polysaccharide fiber materials in the pulp. The treated fiber has a hypocholesterolemic effect which is superior to that achieved by employing the treatment process upon refined pectin and/or refined cellulose. It appears that the combination of constituents naturally found in dietary fiber results in a synergistic hypocholesterolemic effect when treated in accordance with the process of the invention.

Without intending to be limited thereby, we believe that the second aspect of the invention enhances the natural hypocholesterolemic effect of pulp material by enhancing the natural bile acid binding capacity of the pulp material.

Method One

The first method by which the natural hypocholesterolemic effect of a pulp material may be enhanced includes the step of reacting the pulp material with a reactant(s) capable of chemically coupling alkaline earth metal ions at naturally reactive sites on the fiber component of the pulp. We have discovered that the hypocholesterolemic effect may be further improved by treating the pulp material so as to disrupt (rupture) the cell structure of the pulp prior to reacting the pulp material with the coupling reactant(s). It is believed that such rupturing of the cell structure releases certain materials retained within the cells which then assist in obtaining the desired treatment of the fiber.

This first method is premised upon our discovery that the concentration of alkaline earth metal ions coupled to a pulp material may be increased to a limited extent by simply contacting the pulp material with a source of alkaline earth metal ions such as $Mg^{++}$ or $Ca^{++}$ at a pH of less than about 7. Contacting the pulp material with a source of alkaline earth metal ions at a pH of greater than about 7 does not result in a meaningful increase in the concentration of alkaline earth metal ions coupled to the pulp material.

Without intending to be limited thereby, we believe that this method is capable of increasing the concentration of alkaline earth metal ions coupled to a pulp material because pectin contains a proportion of naturally reactive pendant groups which are inherently capable of bonding to alkaline earth metal ions under acidic conditions without modification. For this reason, the preferred pulps include at least about 2% and most preferably at least about 10% pectin.

The initial step of disrupting the cell structure of the pulp is believed to significantly enhance the hypocholesterolemic effect of the resultant treated pulp by significantly increasing the surface area of the pulp material which is accessible to the coupling reactant.

The cell structure may be disrupted by any convenient method including specifically, but not exclusively: freezing, refrigeration, mechanical abrasion, enzymatic reactions, dramatic changes in pressure, and the like.

Coupling reactants suitable for use in this method include any reactant capable of providing a source of alkaline earth metal ions at a pH of less than about 7 such as calcium chloride, calcium sulphate, and Nigari The actual extent of any increase in the bile acid binding capacity of the pulp depends upon several factors including the type of pulp employed, the exact reactant(s) employed, and the reaction conditions.

Generically, we have discovered that saturation of the pulp material with about a 0.01 N to about 2 N aqueous solution of the source of alkaline earth metal ions for about one minute to two hours (dependent upon reaction temperature) at a temperature of about 4°-100° C., preferably about 15 to 30 minutes at a temperature of about 70°-100° C., will typically result in effective bonding of alkaline earth metal ions to the pulp material.

The reaction temperature can significantly affect the speed of the reaction. The reaction proceeds too slowly to be of practical use at temperatures less than about 4° C. while temperatures above about 100° C. result in flashing of the water from the mixture. We believe that the reaction can be conducted at temperatures above about 100° C. by performing the reaction under sufficient pressure so as to prevent flashing. While this would require the use of equipment capable of handling such elevated temperatures and pressures, such as a scrape surface heat exchanger, steam injector system or steam infusion system, the use of elevated temperatures of from about 100° C. to about 150° C. can reduce the reaction time to less than about 1 minute and in many instances to less than about 10 seconds.

Method Two

The second method by which the hypocholesterolemic effect of a pulp material may be enhanced includes the steps of (i) reacting the pulp material with a first reactant(s) capable of chemically modifying/replacing at least a portion of the pendant hydroxyl groups on the fiber constituent of the pulp to pendant groups capable of chemically coupling with alkaline earth metal ions, and then (ii) reacting the once reacted pulp material with a second reactant(s) capable of chemically coupling an alkaline earth metal ion to the altered pendant groups.

As with the first method, we have discovered that the hypocholesterolemic effect may be further improved by treating the pulp material so as to disrupt the cell structure of the pulp prior to reacting the pulp material with the first reactant(s).

This second method is designed to achieve an increase in the hypocholesterolemic effect of a pulp material by increasing the sites available for binding an alkaline earth metal ion and thereby increasing the concentration of alkaline earth metal ions attached to the pulp fiber. As with method one, the actual extent of the increase depends upon several factors including type of pulp employed, the exact reactant(s) employed, and the reaction conditions.

Cell Disruption

The initial step of disrupting the cell structure of the pulp is believed to significantly enhance the hypocholesterolemic effect of the resultant treated pulp by significantly increasing the surface area of the pulp material which is accessible to the activating and coupling reactants.

The cell structure may be disrupted by any convenient method including specifically, but not exclusively: freezing, refrigeration, mechanical abrasion, enzymatic reactions, dramatic changes in pressure, and the like.

Activation of the Pulp Material

The raw pulp is first pretreated to activate at least a portion of the naturally unreactive pendant groups on the polysaccharides contained in the pulp. Specifically, activation of the pulp is believed to be achieved through conversion of pendant hydroxyl groups on the polysaccharides contained in the pulp to pendant groups capable of ionically bonding to an alkaline earth metal ion.

The first step in activation of the pulp material includes treatment of the pulp material with a first activating reactant capable of forming a metal salt with the pendant hydroxide groups. Suitable reactants for use as the first activating reactant in the process include specifically, but not exclusively, caustics such as sodium hydroxide, potassium hydroxide, calcium hydroxide and ammonia hydroxide; alkali metal carbonates and bicarbonates such as sodium bicarbonate and potassium carbonate; and alkaline phosphates such as, disodium phosphate dihydrate, trisodium orthophosphate decahydrate and sodium hexametaphosphate.

We have discovered that activation of the pulp material by bonding metal salts to the pendant hydroxide groups on the polysaccharides contained in the pulp can be achieved only under substantially alkaline pH conditions of between about 7 and about 10. Accordingly, the activating first reactant must be selected to provide an alkaline environment.

The first activating reactant may conveniently be brought into reactive contact with the pulp material by reacting the pulp material with an aqueous solution of the first activating reactant.

The once treated pulp material is then treated with a second activating reactant capable of replacing the cation added by the first activating reactant with a group capable of ionically bonding to an alkaline earth metal ion. Reactants suitable for use as the second activating reactant in the process of the invention include specifically, but not exclusively, carboxylating compounds such as monochlorosodium acetate and monochloroacetic acid.

Similar to the first activating reactant, the second activating reactant may conveniently be brought into reactive contact with the pulp material by reacting the pulp material with an aqueous solution of the reactant.

We have discovered that activation of the pulp material in this manner generally results in a dramatic increase in the viscosity enhancing ability of the pulp material. While such an increase in the viscosity modifying ability of the pulp material typically requires the use of equipment capable of handling such highly viscous materials throughout the remainder of the process, the viscosity increase does not generally interfere with the properties and/or characteristics of the final product.

Without intending to be limited thereby, we believe that the increase in viscosity is caused by the release of pectin from the fiber mass with subsequent formation of sodium carboxymethylcellulose, a known viscosity enhancer.

The reaction time, reaction temperature, reactant concentration, ratio of reactant to pulp material, and type of reactant are interdependent with respect to both the first and second reactions. Generally, it is desired to maintain the reaction temperature during both the first and second activation reactions between about 4° C. to about 100° C. as temperatures below about 4° C. proceed too slowly to be of practical use while temperatures above about 100° C. require special process equipment to maintain efficiency.

Generically, we have discovered that saturation of the pulp material with about a 0.01 N to about 2 N aqueous solution of each of the activating reactants for about one minute to two hours (dependent upon reaction temperature) at a temperature of about 4°–100° C., preferably about 15 to 30 minutes at a temperature of about 70°–100° C., will typically result in effective activation of the polysaccharides.

We believe that the reaction can be conducted at temperatures above about 100° C. by performing the reaction under sufficient pressure so as to prevent flashing. While this would require the use of equipment capable of handling such elevated temperatures and pressures such as a scrape surface heat exchanger, a steam injector system, and a steam infusion system, the use of elevated temperatures of from about 100° C. to about 150° C. can reduce the reaction time to less than about 1 minute and in many instances to less than about 10 seconds.

Addition of Alkaline Earth Metal Ions to the Activated Pulp Material

Once activated, the pulp material is treated with a third reactant(s) for the purpose of bonding an alkaline earth metal ion to the pulp material at the naturally and synthetically reactive sites. The third reactant(s) is an alkaline earth metal salt which can provide a source of alkaline earth metal ions for bonding to the reactive sites. Suitable reactants for use as the third reactant in our process include specifically, but not exclusively alkaline earth metal hydroxides, alkaline earth metal carbonates, and alkaline earth metal bicarbonates. The preferred alkaline earth metal is calcium.

As with the first and second reactions, the reaction time, reaction temperature, reactant concentration, ratio of reactant to pulp material, and type of reactant for the third reaction are interdependent variables.

Generically, we have discovered that saturation of the pulp material with about a 0.01 N to about 2 N aqueous solution of the third reactant for about one minute to two hours (dependent upon reaction temperature) at a temperature of about 4°–100° C., preferably about 15 to 30 minutes at a temperature of about 70°–100° C., will typically result in effective chemical bonding of alkaline earth metal ions to the pulp material.

The reaction temperature can significantly affect the speed of the reaction. The reaction proceeds too slowly to be of practical use at temperatures less than about 4° C. while temperatures above about 100° C. result in flashing of the water from the mixture. We believe that the reaction can be conducted at temperatures above about 100° C. by performing the reaction under sufficient pressure so as to prevent flashing. While this would require the use of equipment capable of handling such elevated temperatures and pressures such as a scrape surface heat exchanger, steam injector system, and steam infusion system, the use of elevated temperatures of from about 100° C. to about 150° C. can reduce the reaction time to less than about 1 minute and in many instances to less than about 10 seconds.

While not absolutely necessary, the pulp material should be washed and filtered after each step in the process in order to decrease interaction between the reactants employed in the various stages of the process and remove insoluble precipitates.

Method Three

We have discovered that the dramatic increase in viscosity which results from activation of the pulp material in the second method may be substantially eliminated by treating the pulp material with a source of alkaline earth metal ions in accordance with the first method prior to activating the pulp material in accordance with the second method. Without intending to be limited thereby, we believe that the increase in viscosity results from release of the pectin portion from the pulp material during activation with subsequent formation of carboxymethylcellulose and that treatment of the pulp material in accordance with the first method prior to activation prevents the increase in viscosity by converting soluble pectin to an insoluble pectate.

The ability of the chemically modified pulp material to provide an enhanced hypocholesterolemic effect depends upon several factors which includes the degree of substitution (DS) achieved. The degree of substitution represents the number of hydroxyl groups on each residue which have been effectively activated and coupled to an alkaline earth metal ion. Since each residue has three pendant hydroxyl groups available for activation ($C_2$, $C_5$, and $C_6$ carbon atoms) the maximum theoretical DS is 3.

Final preparation of the modified pulp material involves drying and packaging. The modified pulp material may be dried by any of the well known conventional drying means including specifically but not exclusively press drying, drum drying, fluidized bed drying, freeze drying, forced air oven drying, vacuum oven drying, puff drying, and combinations thereof. The pulp material is preferably dried to a moisture content capable of suppressing the growth of microorganisms and resulting in a product with an effective shelf life. In general, a moisture content of less than about 10% will achieve these desired benefits with a moisture content of less than about 5% being preferred.

The resultant modified pulp may be milled to form a flour which may then be employed in addition to or as a partial substitute for any of the commonly employed farinaceous compounds wherever such farinaceous compounds are employed. Alternatively, the modified pulp material may be granulated for use as a table-top dietary supplement which can be sprinkled onto various foods at the point of consumption. Optionally, the granulated table-top product may be combined with various herbs and spices.

EXPERIMENTAL Experiment I First Aspect

Into a stainless steel double boiler equipped with a mixing device is placed 2 liters of deionized water. The water is heated to 80° C. at which time 2 cups of thawed carrot pulp are added. The carrot pulp slurry is maintained at 80° C. under constant agitation for 5 minutes.

The reacted carrot pulp is separated from the water, washed with cold tapwater, filtered through two layers of cheesecloth, frozen and subsequently freeze dried.

Experiment II Second Aspect Method One

Into a stainless steel double boiler equipped with a mixing device is placed 2 liters of 0.0275 M $CaCl_2$ solution. The calcium chloride solution is heated to 80° C. at which time 2 cups of thawed carrot pulp are added. The carrot pulp slurry is maintained at 80° C. under constant agitation for 5 minutes.

The reacted carrot pulp is separated from the calcium chloride solution, washed with cold tapwater, filtered through two layers of cheesecloth, frozen and subsequently freeze dried.

Experiment III Second Aspect Method One

Into a stainless steel double boiler equipped with a mixing device is placed 2 liters of a 0.0275 M $CaCl_2$ solution. The calcium chloride solution is heated to 80° C. at which time 2 cups of thawed carrot pulp is added. The carrot pulp slurry is maintained at 80° C. under constant agitation for 30 minutes.

The reacted carrot pulp is separated from the calcium chloride solution, washed with cold tapwater, filtered through a cheesecloth, frozen and subsequently freeze dried.

Experiment IV Second Aspect Method One

Into a stainless steel double boiler equipped with a mixing device is placed 1 liter of a 0.055 M $CaCl_2$ solution. The calcium chloride solution is heated to 87° C. at which time 2 cups of thawed carrot pulp is added. The carrot pulp slurry is maintained at 87° C. under constant agitation for 10 minutes.

The reacted carrot pulp is separated from the calcium chloride solution, washed with cold tapwater, filtered through a cloth, frozen and subsequently freeze dried.

Experiment V Second Aspect Method Two

Into a stainless steel double boiler equipped with a mixing device is placed 4 cups of tap water. The tapwater is heated to 90° C at which time 2 cups of thawed carrot pulp and 0.9 grams of sodium hydroxide is added to the water to form a first pulp slurry. The first pulp slurry is maintained at 90° C under constant agitation for one hour. The once reacted pulp is separated from the sodium hydroxide solution by filtration through a cheese cloth and then washed with cold tapwater to remove any residual sodium hydroxide.

The once reacted pulp is placed back into the double boiler, redispersed with 4 cups of tapwater and reheated to 90° C. Into the reheated slurry is placed one teaspoon of flaked $CH_2ClCOOH$ to form a second pulp slurry. The second pulp slurry is maintained at 90° C. under constant agitation for 30 minutes during which time the second pulp slurry will thicken substantially. The thickened, twice-reacted pulp is separated from the $CH_2ClCOOH$ solution by filtration through a cheese cloth, washed with cold tapwater to remove any residual $CH_2ClCOOH$, and then refiltered to remove excess wash water.

Experiment VI Second Aspect Method Three

Into a stainless steel double boiler equipped with a mixing device is placed 2 liters of a 0.0275 M $CaCl_2$ solution. The calcium chloride solution is heated to 80° C. at which time 2 cups of thawed carrot pulp is added. This first carrot pulp slurry is maintained at 80° C, under constant agitation for 5 minutes. The once reacted carrot pulp is separated from the calcium chloride solution and washed with cold tapwater.

Into a second stainless steel double boiler is placed 4 cups of a 0.1 N solution of NaOH. The sodium hydroxide solution is heated to 65° C. and the once reacted carrot pulp added. This second carrot pulp slurry is maintained at 65° C. under constant agitation for 20 minutes. The twice reacted carrot pulp is separated from the sodium hydroxide solution by filtration and washed with cold tapwater.

Into a third double boiler is placed 4 cups of a 0.1 N solution of $CH_2ClCOOH$. The monochloroacetic acid solution is heated to 65° C. and the twice reacted carrot pulp added. This third carrot pulp slurry is maintained at 65° C. under constant agitation for 20 minutes. The third reacted carrot pulp is separated from the monochloroacetic acid solution, washed with cold tapwater to remove any residual monochloroacetic acid, frozen and subsequently freeze dried.

Experiment VII Second Aspect Method Three

Into a stainless steel double boiler equipped with a mixing device is placed 2 liters of a 0.0275 M $CaCl_2$ solution. The calcium chloride solution is heated to 77° C. and 2 cups of thawed carrot pulp added. This first carrot pulp slurry is maintained at 77° C under constant agitation for 15 minutes to form once reacted carrot pulp.

Into the first carrot pulp slurry, still containing residual calcium chloride, is placed 1/2 teaspoon $NaHCO_3$ to form a second carrot pulp slurry. The second slurry is maintained at 77° C. under constant agitation for 15 minutes to form twice reacted carrot pulp.

Into the second carrot pulp slurry, still containing residual sodium bicarbonate, is placed 1/2 teaspoon $CH_2ClCOOH$ to form a third carrot pulp slurry. The third slurry is maintained at 70° C. with occasional agitation for 15 minutes to form thrice reacted carrot pulp. The thrice reacted carrot pulp is separated from the monochloroacetic acid solution by filtration and air dried.

Experiment VIII Fresh Pulp v. Frozen Pulp

Treated fiber was produced in accordance with the procedures set forth in Experiments II-VII based upon the variables set forth in Table One. The viscosity of the treated fiber was measured with a Brookfield Model RVT viscometer equipped with a #1 spindle and recorded. The viscosity of the controls were obtained using aqueous diluted untreated pulp obtained from the same pulp source as that used for the treated pulp tests.

The viscosity of the treated fiber indicates the extent to which the naturally unreactive hydroxyl groups have been replaced with carboxyl groups and/or the extent to which calcium has attached to the fiber. An aqueous solution of a carboxylated and/or calcium treated polysaccharide tends to produce a significantly greater increase in viscosity than untreated polysaccharides. Hence, the viscosity of the treated fiber should directly indicate the degree of substitution and/or calcium attachment (high substitution/attachment=high viscosity).

TABLE ONE

| Fiber Source (type/g) | Frsh/Frzn (hrs) | Treatment Method | CaCl Treatment | | | NaOH Treatment | | | ClCH$_2$COOH Treatment | | | $\mu$ (cps) |
|---|---|---|---|---|---|---|---|---|---|---|---|---|
| | | | Amount (vol/M) | Temp (°C.) | Time (min) | Amount (vol/M) | Temp (°C.) | Time (min) | Amount (vol/M) | Temp (°C.) | Time (min) | |
| Carrot (****) | Fresh | Exp VI | 1 liter 0.0275 M | 85 | 5 | 1 liter 0.1 M | 66 | 20 | 1 liter 0.1 M | 66 | 20 | 10.0 |
| Carrot (****) | Frozen | Exp VI | 1 liter 0.0275 M | 85 | 5 | 1 liter 0.1 M | 66 | 20 | 1 liter 0.1 M | 66 | 20 | 37.0 |
| Carrot (****) | Frozen | Exp V | — | — | — | 1 liter 0.09 M | 88-91 | 60 | 1 liter 0.1 M | 88-91 | 30 | 98.5 |

Conclusions: The product obtained by treating frozen pulp in accordance with the process of the second method of the invention has a viscosity which is significantly greater than the product obtained by identical treatment of fresh pulp.

Pretreatment of frozen pulp with CaCl (third method) prior to treating the pulp in accordance with the process of the second method of the invention results in a significant reduction in the viscosity of the final product.

I claim:

1. A process for enhancing the hypocholesterolemic effect of edible pulp comprising the step of treating edible pulp with calcium chloride at a pH of less than about 7 so as to increase the concentration of calcium ions chemically coupled to the pulp.

2. The process of claim 1 wherein the step of treating the pulp with calcium chloride comprises treating the pulp with an aqueous solution of calcium chloride at a temperature of about 100 C. to about 150° C. under sufficient pressure to prevent flashing.

3. The process of claim 1 wherein the step of obtaining edible pulp comprises obtaining pulp from a food selected from the group consisting of apples, barley, carrots, corn, grapefruits, oats, oranges, peas, rice, sugarbeet, sugar cane, and wheat.

4. The process of claim 1 wherein (i) the pulp material comprises at least one polysaccharide having a natural hypocholesterolemic effect, (ii) the polysaccharide has pendant hydroxyl groups, and (iii) treatment of the pulp material to enhance the hypocholesterolemic effect of the pulp material comprises the steps of:

(a) chemically modifying at least a portion of the pendant hydroxyl groups on the polysaccharide to form pendant groups capable of chemically coupling with an alkaline earth metal ion, and
(b) treating the once modified polysaccharide of step (a) with an alkaline earth metal containing reactant under conditions sufficient to cause at least a portion of the modified pendant groups on the polysaccharide to chemically couple with an alkaline earth metal ion.

* * * * *